J. R. McCOSH.
DIRIGIBLE HEADLIGHT.
APPLICATION FILED JULY 11, 1921.
1,411,048.
Patented Mar. 28, 1922.
3 SHEETS—SHEET 1.
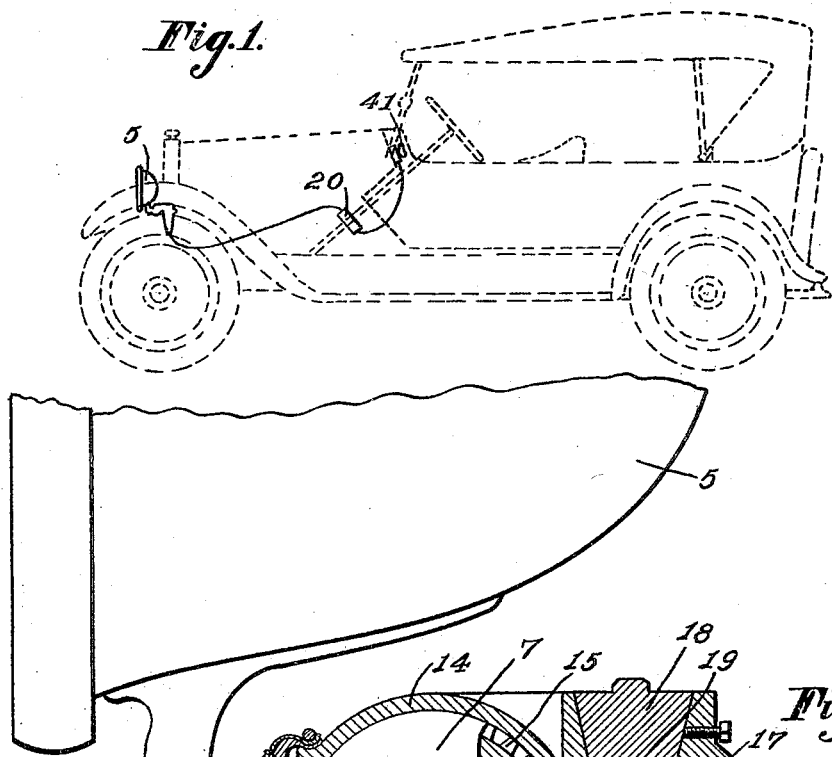
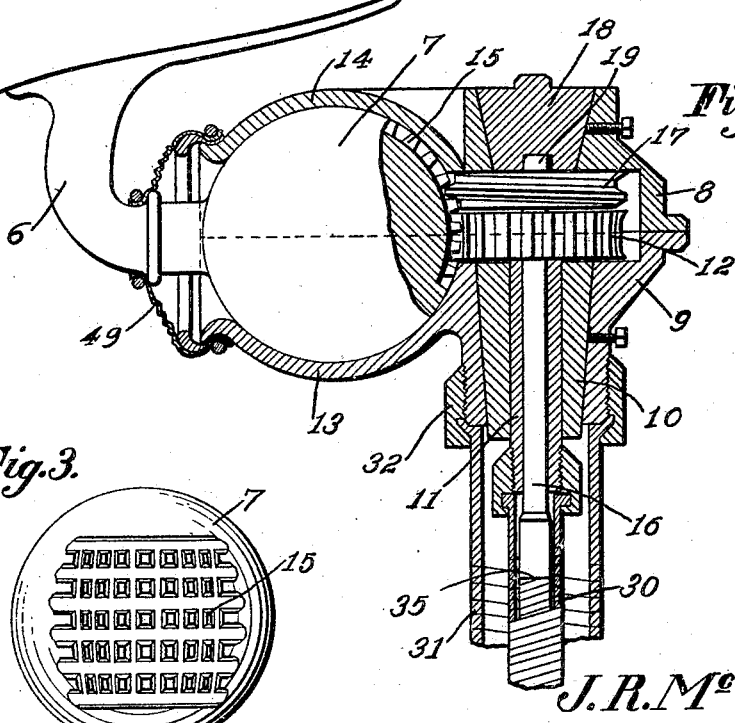
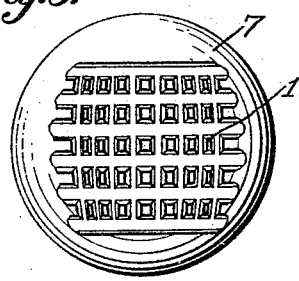
Inventor
J. R. McCosh.
By C. A. Snow & Co.
Attorney

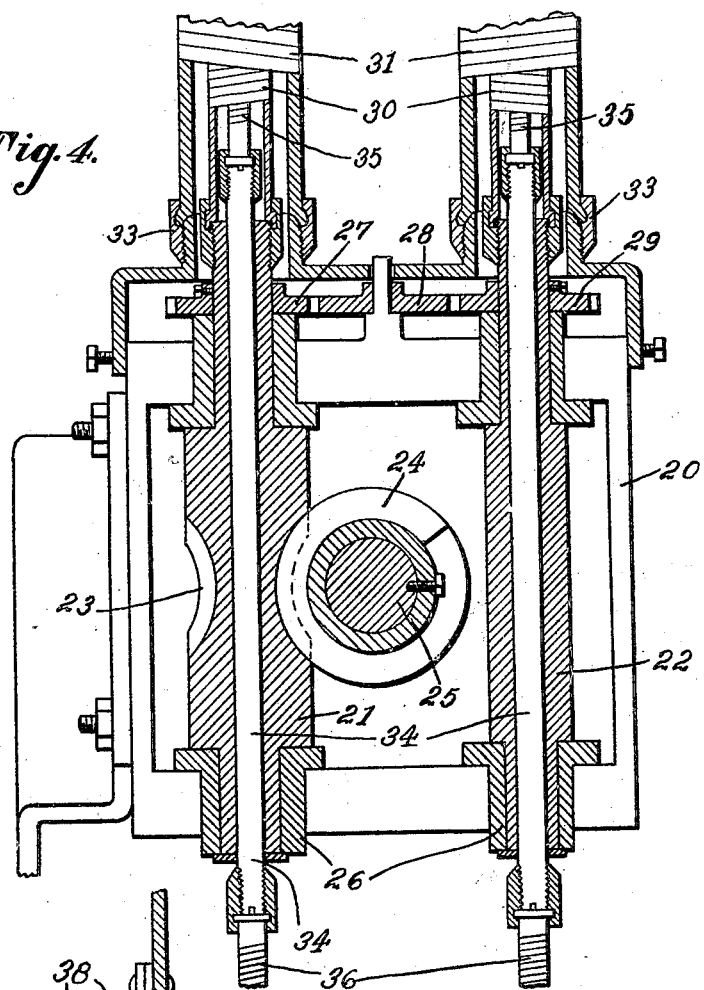
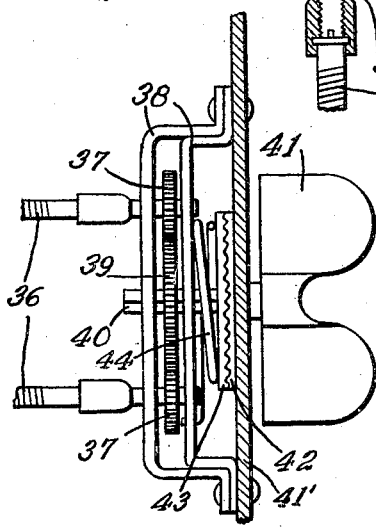

UNITED STATES PATENT OFFICE.

JOSEPH R. McCOSH, OF CASPER, WYOMING.

DIRIGIBLE HEADLIGHT.

1,411,048.　　　　Specification of Letters Patent.　　Patented Mar. 28, 1922.

Application filed July 11, 1921.　Serial No. 483,846.

*To all whom it may concern:*

Be it known that I, JOSEPH R. McCOSH, a citizen of the United States, residing at Casper, in the county of Natrona, and State of Wyoming, have invented a new and useful Dirigible Headlight, of which the following is a specification.

This invention relates to headlights for motor vehicles, and more particularly to headlights of the dirigible type, it being the primary object of the invention to provide novel means for adjusting the headlights in horizontal planes.

A further object of the invention is to provide means for adjusting the headlights in vertical planes, novel means being provided for locking the headlights in their adjusted positions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a side elevational view disclosing a motor vehicle in dotted lines, and showing the invention as applied thereto, Figure 2 is a fragmental elevational view partly broken away to illustrate the gearing employed to accomplish the adjusting of the headlights.

Figure 3 is an elevational view disclosing the teeth on the ball formed at one end of the lamp arm.

Figure 4 is a sectional view through the gearing casing which support the operating gears.

Figure 5 is an elevational view disclosing the operating key.

Figure 6:
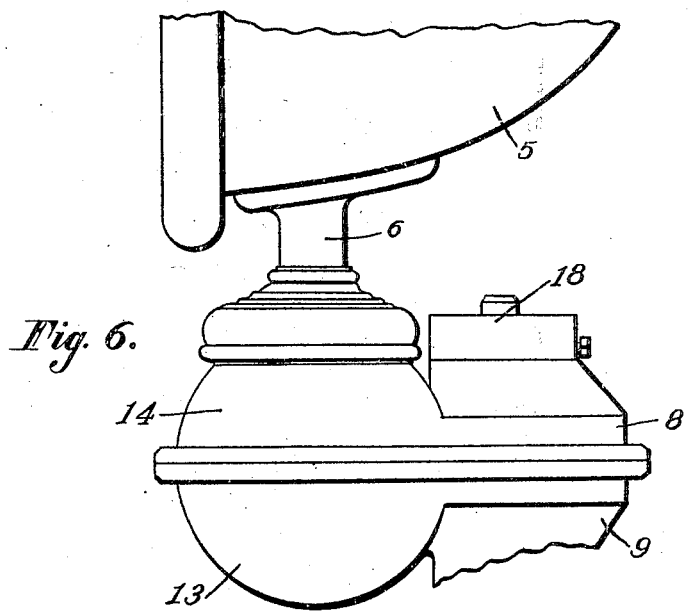
Figure 6 is an elevational view showing one of the headlights and support.
Figure 7:
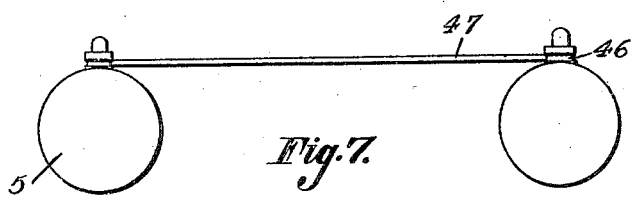
Figure 7 is a plan view of a pair of headlights disclosing the connection therebetween.
Figure 8:
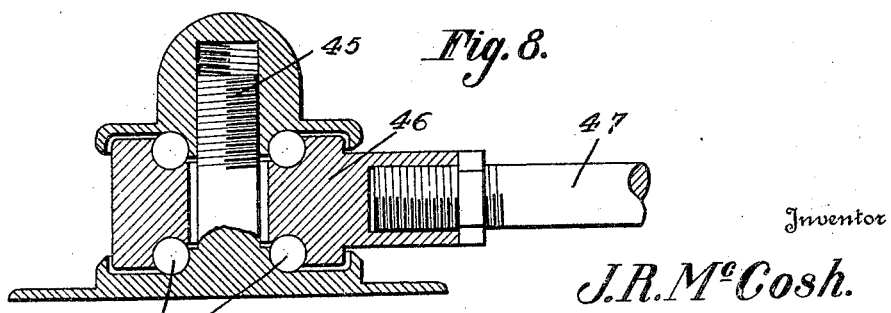
Figure 8 is a sectional view disclosing in detail the connection between the connecting rod and the lamps.

Referring to the drawings in detail, the lamps are indicated by the reference character 5, which lamps are of the usual constructions, each of which being provided with a lamp arm 6 extending downwardly and inwardly, there being provided a ball 7 on the inner end thereof.

Each lamp is supported by a bracket including an upper section 8 and a lower section 9, which sections may be secured together in any suitable manner, it being understood that the brackets are made sectional to permit the gears and operating element to be positioned therein.

The lower section of each bracket is provided with an opening to accommodate the tapered plug 10, which is provided with a central bore to accommodate the tubular shaft 11 which has connection with the pinion 12, at one end thereof, the connection between the tubular shaft 11 and plug 10 being such as to permit the tubular shaft 11 to rotate freely.

The bracket also includes a curved member 13 adapted to cooperate with the curved member 14 providing a socket for the ball 7, which is provided with rows of teeth 15 formed thereon throughout a portion of its circumference.

Disposed within the hollow shaft 11 is a shaft 16 which passes through the pinion 12 and supports the worm 17, which worm is in mesh with the teeth 15 to rotate the ball 7 in a vertical plane to accomplish the adjustment of the lamp associated therewith. The pinion 12 is also in mesh with the teeth 15, and is designed to rotate the ball 7 in a horizontal plane to accomplish the adjustment of the lamp in a horizontal plane. In order that the shaft 16 will be supported against lateral movement, the bearing member 18 is provided and positioned in the upper end of the bracket, the bearing member being shown as having a recessed portion to accommodate the end 19 of the shaft 16.

Associated with the brackets is a gear casing indicated at 20, in which gear casing are mounted the shafts 21 and 22 respectively, the shaft 21 being provided with gear teeth 23 meshing with the worm 24 that is bolted or otherwise secured to the steering post 25 so that movement of the steering post will result in a relative movement of the worm 24, to accomplish the movement of the shaft 21.

The shafts 21 and 22 are supported in bearings 26 which are positioned in the end walls of the casing 20. Mounted on the shaft 21 to move therewith is a pinion 27 which meshes with the pinion 28 which in turn is in mesh with the pinion 29 supported by the shaft 22, the shafts 21 and 22 have connection with the shafts 11, through the flexible shaft 30 which are supported within the flexible housings 31 that have their ends connected to the bracket members 9 as by means of the collars 32, the opposite ends thereof being connected with the casing 20 as by means of the collars 33.

The shafts 21 and 22 are hollow and accommodate the shafts 34 which have connection with the shafts 16 through the flexible shafts 35, whereby movement of the shafts 34 produces a relative movement of the worm 17 to rotate the ball 7 and adjust the lamp associated therewith in a vertical plane. The inner ends of the shafts 34 have connection with the flexible shafts 36 which carry pinions 37 that are mounted between the bracket members 38, there being provided a pinion 39 disposed between the pinions 37 so that rotary movement of the pinion 39 will impart rotary movement to the pinions 37 to rotate the flexible shafts 36.

A squared shaft 20 supports the pinion 39 and carries the winged head 41 on one end thereof, whereby the shaft 40 and its pinion 40 may be rotated. Supported by the member 41', which may be a part of the instrument board is a clutch face 42 that cooperates with the clutch member 43, that is carried by the shaft 40, the coiled spring 44 being interposed between one of the bracket members 38 and the clutch member 43 for normally urging the clutch member into engagement with the clutch face 42 for locking the shaft 40 and its pinion, against movement. From the foregoing it will be seen that if it is desired to rotate the pinions 39 to adjust the lamps 5 in vertical planes, the operator forces the winged head 41 inwardly, to disengage the clutch face 42 and clutch member 43, whereupon the shafts 36 may be rotated to rotate the worm 17.

It is obvious that when the winged head 41 is released, the coiled spring 44 urges the clutch member 43 into locked engagement with the clutch face 42 to prevent rattling of the mechanism.

It may be found desirable to provide an operating mechanism as connected with one of the lamps of a vehicle and to connect the other lamp thereto, in a manner so that movement of one lamp will be transmitted to the adjacent lamp, and to this end, the lamps may be provided with rearwardly extending bolts 45, which accommodates the heads 46 connected to the rod 47 that extends between the lamps. Suitable ball bearings 48 are provided to permit of movement of the heads 46 with respect to the bolts 45.

It might be further stated that in order to exclude dust or other foreign matter from the interior of the socket member, a flexible covering 49 is provided, which covering connects the socket member with the arms 6 as clearly illustrated by Figure 2 of the drawings:—

Having thus described the invention, what is claimed as new is:—

1. In a dirigible headlight, a bracket, said bracket having a socket, a lamp supporting arm having a ball formed on one end thereof and disposed within the socket, said ball having teeth formed on the periphery thereof, a shaft extending through the bracket, said shaft carrying a worm at one end and having a pinion disposed thereunder, said worm and pinion adapted to cooperate with the teeth of the ball to move the lamp in various directions, and means for controlling the movements of the worm and pinion.

2. In a dirigible headlight, a bracket, said bracket having a socket, a lamp supporting arm having a ball formed thereon and disposed within the socket, teeth on the ball, a shaft carrying a worm and pinion, the worm and pinion meshing with the teeth of the ball, means for moving the worm to move the lamp supporting arm in a vertical plane, and means for moving the pinion to move the lamp supporting arm in a horizontal plane.

3. In a dirigible headlight, a bracket, a shaft extending through the bracket, a pinion and a worm supported on the shaft to move therewith, a lamp supporting arm having a ball on one end thereof, said bracket having a socket to accommodate the ball, means on the ball and cooperating with the worm and pinion, whereby movement of the worm and pinion produces a relative movement of the ball, and means for moving the worm and pinion independently of each other.

4. In a dirigible headlight, a bracket, said bracket having a socket member extending laterally therefrom, a lamp supporting arm having a ball formed thereon, and disposed within the socket member, a shaft extending into the bracket member and carrying a worm and pinion, means on the ball and contacting with the worm and pinion, whereby movement of the worm or pinion produces a relative movement of the ball and lamp supporting arm, and means for operating the pinion independently of the worm.

5. In a dirigible headlight, a bracket, said bracket having a socket member, a lamp supporting arm having a ball disposed within the socket member, a shaft extending into the bracket and carrying means cooperating with the ball for moving the lamp supporting arm in vertical and horizontal planes, and means for operating the worm and pinion.

6. In a dirigible headlight, a bracket, said bracket having a socket member, a lamp sup-